United States Patent
Fujimoto et al.

[11] Patent Number: 5,405,705
[45] Date of Patent: Apr. 11, 1995

[54] METHOD FOR PREPARING RESIN-REINFORCED DECORATIVE BOARD

[75] Inventors: Masaru Fujimoto, Kawaguchi; Masami Kondo, Koshigaya; Michio Chatani; Tadayuki Tsuchiya, both of Kitakanbara, all of Japan

[73] Assignees: Oshika Shinko Co., Ltd., Tokyo; Kuraray Co., Ltd., Kurashiki, both of Japan

[21] Appl. No.: 989,803

[22] Filed: Dec. 11, 1992

[30] Foreign Application Priority Data

Dec. 13, 1991 [JP] Japan .................................. 3-351348
Dec. 4, 1992 [JP] Japan .................................. 4-350106

[51] Int. Cl.⁶ .............................................. B32B 21/04
[52] U.S. Cl. ................... 428/537.1; 156/306.9; 156/307.5; 156/313
[58] Field of Search ................ 156/307.5, 306.9, 313; 428/537.1

[56] References Cited

U.S. PATENT DOCUMENTS

| 3,770,555 | 11/1973 | Gladstone et al. | 156/306.9 |
| 4,791,184 | 12/1988 | Nagai et al. | 525/305 |

FOREIGN PATENT DOCUMENTS

| 2055021 | 5/1972 | Germany | 156/313 |
| 717093 | 10/1954 | United Kingdom | 156/306.9 |
| 1006399 | 9/1965 | United Kingdom | 428/537.1 |

*Primary Examiner*—John J. Gallagher
*Attorney, Agent, or Firm*—Kenyon & Kenyon

[57] ABSTRACT

There is disclosed a method for preparing a resin-reinforced decorative board which comprises the steps of interposing a polymerizable gelatinous substance between a decorative veneer and a base board, pressurizing and heating the materials to permeate at least part of components constituting the gelatinous substance to the decorative veneer or both of the decorative veneer and the base board, and polymerizing the substance to laminate the decorative veneer and the base board through an adhesive layer.

8 Claims, No Drawings

METHOD FOR PREPARING RESIN-REINFORCED DECORATIVE BOARD

BACKGROUND OF THE INVENTION

This invention relates to a method for preparing a resin-reinforced decorative board. More specifically, it relates to a method for preparing a resin-reinforced decorative board in which a resin-reinforced decorative veneer and a base board are integrally adhered.

A resin-reinforced decorative board obtained by the simple and easy method of the present invention exhibits the beautiful woody appearance inherently possessed by a decorative veneer and also has excellent durability. The resin-reinforced decorative board of the present invention is suitable for use as a decorative plywood having natural woody appearance or a flooring plywood.

Heretofore, natural wood decorative plywood on which decorative veneers, sometimes called fancy veneers, had been adhered to the surfaces of the plywood have been commercially available. In order to improve the dimensional stability or the mechanical strength of the decorative veneer, a resin forming component had been permeated into the decorative veneer and polymerized.

In general, reinforcement of the decorative veneer was carried out by impregnating the veneer with a resin forming component, such as a resin liquid, followed by polymerizing. One such technique, called WPC (Wood Plastic Combination), is one where the wood and the resin are formed into a composite using a monomer or an oligomer as the resin liquid.

Preparation of a decorative board according to the WPC technique is generally carried out by placing the decorative veneers in an autoclave and then reducing pressure therein in order to remove air from decorative veneers. This is followed by injecting a resin forming component such as a monomer, an oligomer, etc., under pressure into the autoclave to permeate the veneers. The veneers are then taken out of the autoclave and separated. Plywood, which is to serve as a base board, is coated on at least one surface with adhesive. The resin permeated decorative veneer sheet is then placed on the adhesive coated surface of the plywood to form a composite. This composite is then heated and pressurized by a hot press thereby effecting polymerization or polycondensation of the resin-forming component as well as adhesion of the decorative veneer sheet and the plywood (Japanese Laid-Open Patent Application No. 75713-1973). However, this method involves a problem in that it requires many steps such as the reducing and pressurizing steps in the autoclave, the separation of the veneer sheets, the adhesive coating of the plywood, the placing of the veneer sheet permeated by the resin-forming component on the surface of the plywood, and the hot pressing, etc. Further, this method involves problems not only requiring multiple steps, but also other complicated problems. For example, the veneer sheets, into which a resin-forming component is permeated, are adhered to each other by the resin-forming component because they are thin. Thus, it is difficult to separate these sheets from one another. Also, when separating the sheets, the veneers sheets sometimes crack or defects occur so that many losses result due to damage to the sheets. This results in lowering the production yield of the products.

There is also a method in which decorative veneers are placed in an autoclave, air in the veneer sheets is removed under reduced pressure, a resin-forming component such as a monomer, an oligomer, etc. is injected into the autoclave, the atmosphere is pressurized in order to permeate the resin-forming component into the decorative veneers, the sheets are then taken out of the autoclave and peeled to separate respective sheets, and a polymerization reaction is effected in a hot press, etc. Thereafter, in the same manner as in the preparation method of usual decorative boards, an adhesive is coated on a base board and the WPC treated decorative veneer is placed on the base board and adherence is caused by hot pressing. However, in this method, there are problems because the steps are complicated. Furthermore, the resin-reinforced decorative veneer formed by the WPC technique is prone to warpage or cracking which leads to lowering the yield and therefore results in poor productivity. Further, in either of the above methods, a resin-forming component is permeated into the inside of decorative veneers from substantially all surfaces of the veneer sheets. Therefore, control of the degree of permeation is difficult. Thus, controlling the wood grain appearance of the decorative veneer is difficult. The beautiful appearance possessed inherently by a wood decorative veneer tends to be lost.

Further, when adhesion takes place, heating and pressurizing are often carried out and the viscosity of the adhesive tends to decrease abruptly due to the heating. In this case, the adhesive tends to flow out from its location between the decorative veneer and a base board or a strong run-off can be ejected from an opening or cracked portion of the veneer sheet. Therefore, it is necessary to control the viscosity of the adhesive, and the heat and pressure conditions. These operations are complicated, and a thick adhesive layer can be difficult to form.

Furthermore, a resin-reinforced decorative board obtained by this method has poor durability when subjected to repeated cool-hot cycles which easily cause cracking in such decorative veneers. It is the present state of the art that even when a coating is applied to the surface of a decorative board, durability is still poor.

SUMMARY OF THE INVENTION

Accordingly, an object of the present invention is to provide a technique which can overcome the various problems of the prior art discussed above.

It is an object of the present invention to provide a novel method for preparing a resin-reinforced decorative board and to provide a resin-reinforced decorative board prepared by said method. The method of the present invention is capable of effecting permeation and adhesion by the same step without the need for the complicated separation of the resin permeated decorative veneers followed by the adhesion of the decorative veneer to a base board. The present invention rationalizes the process. The present invention does not require the difficult step of separating resin permeated veneer sheets which frequently damages the veneer sheets thereby reducing production yield. The present invention also results in the formation of a thick adhesive layer.

The present inventors intensively studied the problems to be solved. As a result, they have found that when a polymerizable gelatinous substance is interposed between a decorative veneer and a base board, and the material is pressurized and heated to cause at least a portion of the components constituting the gelatinous substance to flow, and at least portion of the components positively permeate or impregnate into the thin decorative veneer and polymerize, such a decorative veneer is reinforced by a resin composed of the gelatinous substance, and, also, the base board and the decorative veneer are adhered to one another to result in a resin-reinforced decorative board, all in accordance with the present invention.

That is, according to the present invention, the above objects can be accomplished by a method for preparing a resin-reinformed decorative board which comprises interposing a polymerizable gelatinous substance between a decorative veneer and a base board, pressurizing and heating the materials in order to permeate or impregnate at least part of components constituting the gelatinous substance into the decorative veneer, or into both the decorative veneer and the base board, and polymerizing the substance to laminate the decorative veneer and the base board by means of an adhesive layer.

DESCRIPTION OF THE PREFERRED EMBODIMENT

The decorative veneer to be used in the method of the present invention is a woody material. The thickness thereof is not particularly limited so long as it is a thickness that a polymerizable gelatinous substance interposed between the veneer sheet and the base board can be permeated into by pressurizing and heating. The thickness is preferably 0.05 to 2 mm, and particularly preferably 0.1 to 1 mm. A tree usable as the decorative veneer may be either a conifer or a broad-leaved tree, such as a Japanese oak tree, a Japanese beech tree, a pine tree, a Japanese cedar tree, a Japanese cypress tree, a horse chestnut tree, a walnut tree, a teak tree, a rosewood tree, an elm tree, a camphor tree, a bird's-eye maple tree, or a Japanese hemlock tree. Furthermore, a woody artificial decorative-veneer may be used. The decorative veneer may be subjected to a treatment such as removing a resin contained in the decorative veneer, bleaching, or dyeing or coating.

The decorative veneer may be subjected to a treatment which promotes permeation of the gelatinous substance into the decorative veneer. Likewise, a permeation promoting agent may be added to the gelatinous substance.

The base board to be used in the method of the present invention is not particularly limited, but it preferably includes various materials such as a board material, a curved surface material or a laminated material thereof. Each of these materials comprise a woody material, paper material, a synthetic resin, inorganic materials, or metals. Particularly preferred are various woody materials such as a plywood, a particle board, lumber, hard board, or MDF (Medium Density Fiberboard). When the base board is a woody material, part of the gelatinous substance also permeates into the base board which enables easy adhesion of the base board and an adhesive layer. When the base board is a synthetic resin, a diffusion layer is likely formed since a part of the surface thereof is dissolved and/or swelled by the gelatinous substance. This means that adhesion can be advantageously carried out. When adhesion between various base board materials and an adhesive layer is insufficient, it is possible to perform a prior treatment of the surface of the base board material with a primer.

Thus, the base board and the decorative veneer are integrated by an adhesive layer formed therebetween.

The polymerizable gelatinous substance to be used in the method of the present invention is a substance containing an unpolymerized monomer component and/or an oligomer component. It exhibits a shape maintaining property at ordinary room temperature. At least part of this unpolymerized monomer component, the oligomer component and a matrix resin constituting the gel flows under pressurizing, and it is polymerizable.

The gelatinous substance is not particularly limited so long as it is a gelatinous composition in which a matrix resin constituting the gel comprises a thermoplastic resin, a thermosetting resin or a combination thereof. A partially cross-linked polymer gel is preferred and an acrylic partially cross-linked polymer gel is particularly preferred. It is possible to use a gelatinous material carried on a substrate such as Japanese paper, glass fiber, nonwoven fabric, woven fabric or by blending an organic or inorganic filler.

The partially cross-linked polymer gel to be used as a preferred embodiment of the present invention is a gelatinous substance obtained by polymerizing a mixture comprising a cross-linking monomer and an unsaturated monomer, which may contain a polymer of an unsaturated monomer dissolved therein, and terminating the polymerization during the course thereof thereby increasing the content of the polymer compared to that in the starting mixture. Examples of such a partially cross-linked polymer gel may include an acrylic or styrenic partially cross-linked polymer gel. An acrylic partially cross-linked polymer gel is preferable.

An acrylic partially cross-linked polymer gel which is a particularly preferred embodiment of the present invention is a partially cross-linked polymer gel or a modified composition thereof as disclosed in U.S. Pat. No. 4,791,184, Japanese Patent Applications Laid-Open No. 1705-1987, No. 294311-1990, No. 54217-1991, etc. Of these, a preferred partially cross-linked polymer gel is, for example, a composition obtained by partially polymerizing a mixture comprising 1 to 60% by weight of a cross-linking monomer and 99 to 40% by weight of an unsaturated monomer which principally comprises alkyl methacrylate and may contain its polymer dissolved therein, wherein this composition contains a polymer in an amount not exceeding 80% by weight and the polymer content is increased in an amount of 4 to 62% by weight compared to that in the original mixture. The composition is prepared by pulverizing or kneading the above polymer gel. The composition contains 1 to 100 parts by weight of an unsaturated monomer principally comprising an alkyl methacrylate which may contain a cross-linking monomer, or a syrup principally comprising alkyl methacrylate which contains its polymer dissolved therein and may contain a cross-linking monomer which is added up to 100 parts by weight of the above polymer gel, and pulverized and kneaded composition. The composition is substantially uniformly kneaded to improve flowability and permeability.

Further, in order to improve durability of the resin-reinforced decorative board, a partially cross-linked polymer gel is preferably used which is a composition obtained by partially polymerizing a mixture comprising 3 to 60% by weight of a cross-linking monomer principally comprising di(meth)acrylate containing at least two urethane linkages and 97 to 40% by weight of an unsaturated monomer which principally comprises methyl methacrylate and which may contain its polymer dissolved therein. This composition contains a polymer in an amount not exceeding 80% by weight and the polymer content is increased in an amount of 4 to 62% by weight compared to that in the starting mixture. The composition is prepared by pulverizing and kneading this polymer gel. The composition is 1 to 100 parts by weight of an unsaturated monomer principally comprising alkyl methacrylate which may contain a cross-linking monomer, or a syrup principally comprising methyl methacrylate which contain its polymer dissolved therein and which may contain a cross-linking monomer added to 100 parts by weight of the above polymer gel. The composition is substantially uniformly kneaded to improve flowability and permeability.

Cross-linking monomers used for preparing the partially cross-linked polymer gel are a monomer having at least two (meth)acryloyl groups in the molecule is preferred, which may further contain an urethane linkage, an epoxy group or a hydroxyl group in the molecule. Also, a plural number of cross-linking monomers may be used in combination.

The cross-linking monomers are exemplified by the monomers represented by the following formulae (1) to (8), but the monomer is not limited by these formulae.

$$(M)A-O-R_1-OCONH-R_2-NHCOO-R_1-O(M)A \quad (1)$$

wherein (M)A represents a methacryloyl group or an acryloyl group; $R_1$ represents a substituted or unsubstituted alkylene group having 2 to 10 carbon atoms; and $R_2$ represents a diisocyanate residue having a carbon number of 2 to 15 except for the carbon number of an isocyanate group.

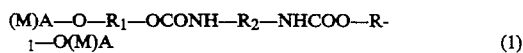

wherein (M)A represents a methacryloyl group or an acryloyl group; $R_3$ represents an ethylene group, a propylene group, a methylethylene group or tetramethylene group; and X represents a group represented by $R_4-Y-R_4-O-$ (where $R_4$ represents an ethylene group or a propylene group; and Y represents polybutadiene or polyisoprene which may be hydrogenated, having a molecular weight of 300 to 4000), a polyether polyol residue having a recurring unit of $-R_3-O-$ and a molecular weight of 300 to 3000; a poly ($\epsilon$-caprolacton)diol residue having a molecular weight of 300 to 3000; a polyester polyol residue represented by the formula:—$(R_5-OCOR_6COO)_n-R_5-O-$ (where $R_5$ represents a polyol residue having 2 to 10 carbon atoms; and $R_6$ represents a dicarboxylic acid residue having 2 to 15 carbon atoms), a polymethyleneglycol residue having a molecular weight of 100 to 300, or a substituted or unsubstituted polyalkyleneglycol residue containing, in the main chain, a cyclohexane ring which may be substituted and having a molecular weight of 100 to 300.

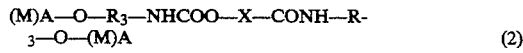

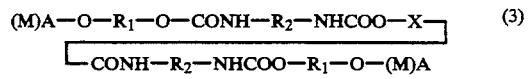

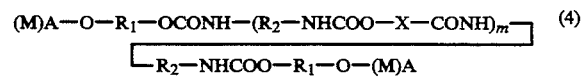

In the above formulae (3) and (4), (M)A represents a methacryloyl group or an acryloyl group; $R_1$ represents a substituted or unsubstituted alkylene group having 2 to 10 carbon atoms; $R_2$ represents a diisocyanate residue having a carbon number of 2 to 15 except for the carbon number of an isocyanate group; and X represents a group represented by $R_4-Y-R_4-O-$ (where $R_4$ represents an ethylene group or a propylene group; and Y represents polybutadiene or polyisoprene which may be hydrogenated, having a molecular weight of 300 to 4000), a polyether polyol residue having a recurring unit of $-R_3-O-$ and a molecular weight of 300 to 3000; a poly($\epsilon$-caprolacton)diol reside having a molecular weight of 300 to 3000; a polyester polyol residue represented by the formula:—$(R_5-OCOR_6COO)_n-R_5-O-$ (where $R_5$represents a polyol residue having 2 to 10 carbon atoms; and $R_6$ represents a dicarboxylic acid residue having 2 to 15 carbon atoms), a polymethyleneglycol residue having a molecular weight of 100 to 300, or a substituted or unsubstituted polyalkyleneglycol residue containing, in the main chain, a cyclohexane ring which may be substituted and having a molecular weight of 100 to 300

(M)A represents a methacryloyl group or an acryloyl group; and $R_7$ represents an alkylene group having 3 to 25 carbon atoms which may be branched or may be substituted; or $R_7$ may contain, in the main chain, a cyclohexane ring which may be substituted.

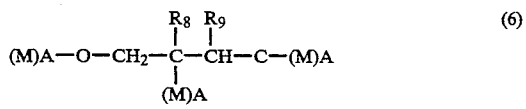

(M)A represents a methacryloyl group or an acryloyl group; $R_8$ represents a group of H, $CH_3$, $C_2H_5$ or $CH_2OH$; and $R_9$ represents a group of H or $CH_3$

wherein n is an integer of 2 to 25; and (M)A represents a methacryloyl group or an acryloyl group.

(M)A represents a methacryloyl group or an acryloyl group; and Z represents a polyester polyol residue or a poly ($\epsilon$-caprolacton)diol reside each having a molecular weight of 300 to 4000.

Of these cross-linking monomers, the compounds represented by the formulae (1), (3), (4), (5) and (7) are preferred.

Also, as the preferred examples of the compounds represented by the formulae (1) or (3), there may be mentioned a compound represented by the following formula (9), (10) or a compound in which the polybutadiene portion of the formula (10) is hydrogenated.

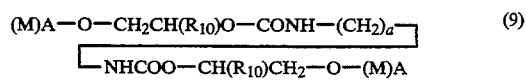

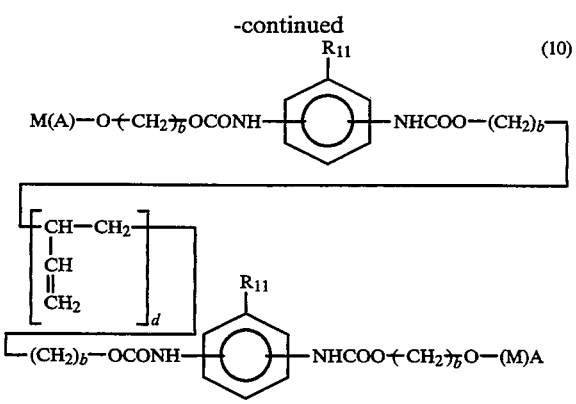

In the formulae (9) and (10), (M)A represents a methacryloyl group or an acryloyl group; $R_{10}$ represents a hydrogen atom, a methyl group or a phenoxymethyl group; $R_{11}$ represents a hydrogen atom or a methyl group; a is an integer of 4 to 8; b is an integer of 2 or 3; and d is an integer of 10 to 60, respectively.

An unsaturated monomer which is principally composed of an alkyl methacrylate, and may contain its polymer dissolved therein, which is used for preparation of an acrylic partially cross-linked polymer gel may be an alkyl methacrylate itself, a mixture principally comprising an alkyl methacrylate and another α, β-ethylenic unsaturated monomer which is capable of copolymerizing with the alkyl methacrylate, or a syrup containing these polymers in the monomer or a monomer mixture dissolved therein. Methyl methacrylate is a most preferred alkyl methacrylate.

The copolymerizable unsaturated monomer may be exemplified by, for example, an alkyl acrylate having 1 to 20 carbon atoms, an alkoxyalkyl acrylate such as methoxyethyl acrylate, an alkyl methacrylate having 2 to 20 carbon atoms, an alkoxyalkyl methacrylate such as methoxydiethylene glycol methacrylate, a phosphate-containing (meth)acrylate such as mono[2-(meth)acryloyloxyethyl]acid phosphate, a hydroxyalkyl acrylate such as 2-hydroxyethyl acrylate, a hydroxyalkyl methacrylate such as 2-hydroxyethyl methacrylate, (meth)acrylic acid, a (meth)acrylate such as neodium (meth)acrylate, lead acrylate, vinyl chloride, vinyl acetate, (meth)acrylonitrile, (meth)acrylamide, styrene, α-methylstyrene, vinyl toluene, maleic anhydride.

The syrup containing a polymer of the above alkyl methacrylate or a monomer mixture mainly comprising the alkyl methacrylate is a monomer solution having a viscosity of 1 to 30000 centipoise at 25° C. and containing 3 to 40% by weight, preferably 5 to 30% by weight, of a polymer. Methyl methacrylate is a most preferred alkyl methacrylate.

A styrene type partially cross-linked polymer gel in which the unsaturated monomer, which principally comprises an alkyl methacrylate and may contain its polymer dissolved therein, starting material of the above acrylic partially cross-linked polymer gel may be replaced with a styrene type compound such as styrene, methylstyrene, vinyl toluene, etc.

The partially cross-linked polymer gel thus obtained contains an unpolymerized monomer component and/or an oligomer component and is constituted by substances having various molecular weights from a low molecular weight substance to a resin component so that it can be permeated into respective parts of wood tissue constituting a decorative veneer by interposing it between a base board and the decorative veneer and then subjecting it to pressurization and heating. Further, depending on the polymerization rate of the partially cross-linked polymer gel, it is possible to control a content of an unpolymerized monomer component or the oligomer component which are highly permeable components and it is also possible to change the content by adding the above syrup or monomer and kneading as described above. Thus, control of the degree permeation into the decorative veneer advantageously can be easily accomplished.

In the method of the present invention, various kinds of gelatinous substances as mentioned above can be used but a gelatinous substance having a viscosity in the range of $3 \times 10^3$ to $5 \times 10^6$ poise, preferably $5 \times 10^3$ to $3 \times 10^6$ poise, more preferably $1 \times 10^4$ to $5 \times 10^5$ poise, is desired. Viscosity is measured by using a KOKA-type flow tester (using a die having a diameter of 2 mm and a length of 2 mm and measured under a load of 4 kg or 16 kg at 50° C.) after the gelatinous substance is mixed dispersively and kneaded to a size of 2 mm or less. If the viscosity is less than $3 \times 10^3$ poise, the gelatinous substance tends to flow out from its location between the decorative veneer and the base board so that an adhesive layer having a desired thickness is difficult to form. On the other hand, if it exceeds $5 \times 10^6$ poise, permeation of the gelatinous substance into the decorative veneer, or the decorative veneer and the base board, tends to become minimal. Therefore, adhesion between the adhesive layer and the decorative veneer and/or the base board tends to become insufficient or the durability of the resulting decorative board in a repeating cool-hot cycle tends to be lowered.

The gelatinous substance used in the method of the present invention may be present in various forms such as a sheet, paste, crushed granules, etc. A sheet-like gelatinous substance may be prepared by various methods. For example, a gelatinous substance may be prepared in a sheet shape with a predetermined thickness. A kneaded gelatinous substance, or a composition in which a syrup or a monomer is added to the gelatinous substance and kneaded, may be pressurized in a conventional manner to make a sheet shape or the like.

The gelatinous substance preferably contains a polymerization initiator which effectively acts on the composition interposed between the base board and the decorative veneer during pressurization and heating. Also, it is possible to blend an adhesion accelerator into the gelatinous substance to increase the adhesion properties between the base board and the decorative veneer. Further, an UV absorber, a light stabilizer, a colorant, a flame-retardant, a preservative or a mothproofing agent, or an organic or inorganic filler may be optionally added to the gelatinous substance depending on necessity. In this case, it is preferred that the viscosity of the substance after adding the various additives is within the preferred viscosity range discussed above.

In the present invention, the gelatinous substance should permeate into the decorative veneer as much as possible. Accordingly, the decorative veneer may be treated by a permeation promoting agent which accelerates permeation of the gelatinous substance into the veneer. Examples of the permeation promoting agents may include a solvent, a plasticizer, or a monomer mixture which reacts with the gelatinous substance interposed between the decorative veneer and the base board. The treatment may be carried out, for example, by dipping the decorative veneer into the permeation promoting agent or coating the agent onto the surface of the sheet. Also, it is possible to add permeation promoting agents such as a plasticizer, dimethylsulfoxide, a surfactant or a ethylene carbonate to the gelatinous substance. If permeation promoting agents added to the gelatinous substance are used in combination with the above permeation promoting treatment of the veneer, permeation of the gelatinous substance can be promoted more effectively. It is also effective to treat the veneer sheet by heating or with chemicals.

As described above, when the gelatinous substance is interposed between the decorative veneer and the base board and pressurized and heated, at least part of a resin component(s) constituting the gelatinous substance and/or an unpolymerized monomer, and oligomer contained therein, is/are permeated into the decorative veneer side, or both the decorative veneer side and the base board side, and polymerized and cured by heat and/or a polymerization initiator. Thus, the decorative veneer is reinforced and an adhesive layer comprising the gelatinous substance which does not permeate is continuously formed between the veneer and the base board whereby both materials are integrally adhered. Further, the gelatinous substance which permeates into the decorative veneer primarily permeates from the base board side (referred to as back surface) of the decorative veneer toward the opposed surface (referred to front surface) so that it is easy to strengthen the characteristics of the grain of the wood on the decorative veneer surface by utilizing the difference in penetrating properties between a spring wood portion and a summer wood portion. This is advantageous for the preparation of a resin-reinforced decorative board which attaches greater importance to appearance.

The amount of the gelatinous substance used in the method of the present invention is not particularly limited. From the view point of durability, it is preferred that an amount be used such that the thickness of the adhesive layer formed between the base board and the decorative veneer after molding becomes 0.2 to 3 mm, preferably 0.3 to 2 mm.

The method of pressurizing and heating used in the present invention is not particularly limited. An ordinary hot press, etc., is preferable. For example, a composite wherein the gelatinous substance is interposed between a base board and a decorative veneer is sandwiched between metal plates, such as stainless steel plates, and placed between the hot plates of a hot press. It is then pressurized and heated in a conventional manner to prepare the resin-reinforced decorative board. It is also possible to place a release film between the metal plates, such as the stainless steel plates, and the decorative veneer or to place a cushioning material such as rubber, cushioning paper, etc. between the stainless steel plates and the hot plates thereby assisting the application of a uniform pressure on the composite to be pressed. Thus, techniques of hot pressing used in preparation of conventional decorative plywood can be used in the present invention. Further, when preparing the decorative board, the positional relationship of the decorative veneer and the base board is not particularly limited. It is possible to place the gelatinous substance and the decorative veneer in that order on the base board, or to place a gelatinous substance and a base board on a decorative veneer. The composite to be pressurized may be vertically oriented and pressurized and heated from the lateral direction.

The heating temperature is preferably 90° to 160° C., particularly preferably 100° to 150° C. The pressure is preferably 3 to 250 kg/cm$^2$, particularly preferably 5 to 20 kg/cm$^2$. By controlling the conditions of heating and/or pressurizing, the degree of permeation of the gelatinous substance can be varied.

In the method of the present invention, it is also possible to first permeate the gelatinous substance into the decorative veneer, or the decorative veneer and the base board, by pressurizing, and then the composite is polymerized and cured under heating.

In accordance with the present invention, a resin-reinforced decorative board is characterized in that a decorative veneer and a base board are integrally adhered through a thick adhesive layer which is continuously formed by polymerizing of a gelatinous substance having preferably a thickness of 0.2 to 3 mm, and at least part of components constituting the gelatinous substance is permeated from the adhesive layer into the decorative veneer or into the decorative veneer and the base board. The adhesive layer of the decorative board is formed by polymerizing and curing of the gelatinous substance. In order to prevent occurrence of warpage of the decorative board and improve durability against cool-hot repeating cycles, tensile breakage elongation (according as JIS K6301, tensile speed: 200 mm/min) of the polymerized and cured product is preferably 5 to 100%, more preferably 8 to 60%, particularly preferably 10 to 50%.

The resin-reinforced decorative board thus obtained has a decorative surface having a suitable wet feeling and a beautiful woody appearance inherently possessed by a woody material since at least part of the components constituting the gelatinous substance interposed between the decorative veneer and the base board is suitably permeated into the decorative veneer and polymerized and cured, and thus it has an excellent appearance.

Also, when the thickness of the adhesive layer of the decorative board and the tensile breakage elongation of the polymerized and cured product of the gelatinous substance are within the above preferred ranges, durability against external circumstances such as repeating cool-hot cycles becomes particularly excellent. Thus, it may be used without using surface coating and the like which are used in conventional WPC method in order to prevent crack of a decorative veneer.

The present invention will be described more concretely by the following working examples. The present invention is not limited by the examples. Measurements and evaluations in examples are carried out by the following methods.

(1) Measurement of polymer content of partially crosslinked polymer gel:

A Soxhlet extractor was charged with 150 ml of dichloromethane to which 1000 ppm of hydroquinonemonomethyl ether had been added. 15 g of the polymer gel in a shape of strip was placed in cylindrical filter paper for extraction and extraction was carried out in a constant temperature water bath maintained at 50° C. for 20 hours. Then, the extract was poured into 1200 ml of methanol to separate the polymer component. The polymer component was combined with the polymer component in the filter paper, and the combined components were dried under reduced pressure at 55° C. until the weight became constant. A weight W (g) of the polymer was weighed and the content was calculated by the following formula.

Polymer content (%)=(W/weight of polymer gel)×100

(2) Measurement of tensile breakage elongation:

A gelatinous substance was pressurized to 100 kg/cm² by using a hot press with a mold temperature of 130° C., and heated and pressured for 10 minutes to mold a plate with a plate thickness of about 1 mm. Tensile breakage elongation was measured with respect to the plate according as the method of JIS K 6301 with a tensile rate of 200 mm/min.

(3) Evaluation of adhesion:

A molded decorative board was cut to form a square test piece with a side length of 75 mm. The resulting test piece was dipped in boiling water for 4 hours. Then, the adhered state of the decorative veneer and the base board was observed with naked eyes, and if no peel off was observed, it was judged as to have passed the test (passed inspection).

(4) Evaluation of durability by repeating cold and hot cycles:

A molded decorative board was cut to form a square test piece with a side length of 100 mm. The resulting test piece was subjected to an operation in which it was allowed to stand in a thermostat bath at 80° C. for 2 hours and then allowed to stand in a thermostat bath at −20° C. for 2 hours. This operation was repeated twice, and then the test piece was allowed to stand until it reached to room temperature. The above operations constituted one cycle and evaluation was repeated. When three cycles or more were repeated, and there was no cracking of the decorative veneer, peeling off of the decorative veneer and the base board, or cracking of the adhesion layer, the test piece was judged as passing the test (passed inspection).

(5) Measurement of viscosity of the gelatinous substance:

Using a flow tester CFT-20 Type (trade name) available from Shimadzu Seisakusho, an apparent viscosity was measured under the conditions of the diameter and the length of the die being 2 mm, respectively, a measurement load of 4 kg or 16 kg, and a measurement temperature of 50° C. and the result was the viscosity of the gelatinous substance. The sample was measured after mixing with a spiral mixer (available from Kodaira Seisakusho, ACM-5 Type) under a rotation of 76 rpm and a revolution of 38 rpm for about 10 min.

Reference Examples 1 and 2

95 Parts by weight of methyl methacrylate monomer, 5 parts by weight of neopentylglycol dimethacrylate, 0.01 part by weight of 1,4(8)-P-menthadiene, 0.01 part by weight of 2,2′-azobis(4-methoxy-2,4-dimethylvaleronitrile), 0.1 part by weight of 2,2-bis(t-butylperoxy)butane, 0.3 part by weight of di-t-butyl peroxide and 0.05 part by weight of di-t-butylperoxyhexahydroterephthalate were mixed and dissolved. The mixture was poured into a cell assembled by two sheets of glass plates and a gasket with a distance of 10 mm and polymerized at 60° C. for the time shown in Table 1 to obtain partially cross-linked polymer gels.

Subsequently, when the above polymer gels were extruded from an extruder having a screw diameter of 50 mm and L/D=8 to obtain compositions pulverized to a maximum diameter of 2 mm or less, respectively.

TABLE 1

| | Polymerization time | Polymer content |
|---|---|---|
| Reference Example 1 | 2 hours | 38% |
| Reference Example 2 | 0.83 hour | 24% |

Reference Example 3

50 parts by weight of methyl methacrylate monomer, 50 parts by weight of the compound represented by the following formula (11) (TE2000, trade name, available from Nippon Soda Co., Ltd.) and 0.005 part by weight of 1,4(8)-P-menthadiene, 0.015 part by weight of 2,2′-azobis(4-methoxy-2,4-dimethylvaleronitrile) were mixed and dissolved. The mixture was polymerized at 60° C. for 2 hours in the same manner as in Reference Example 1 to obtain a partially cross-linked polymer gel. A polymer content of the partially cross-linked polymer gel was 50.7%. The above polymer gel was extruded from an extruder having a screw diameter of 50 mm and L/D=4 to obtain a composition pulverized to a maximum diameter of 2 mm or less. Subsequently, to 100 parts by weight of the pulverized composition was added a prepared solution comprising 1 part by weight of methyl methacrylate monomer and a mixture of 0.1 part by weight of 2,2-bis(t-butylperoxy)butane, 0.3 part by weight of di-t-butylperoxide and 0.05 part by weight of di-t-butylperoxyhexahydroterephthalate as high temperature active polymerization initiators, and the mixture was kneaded by a super mixer to obtain a composition.

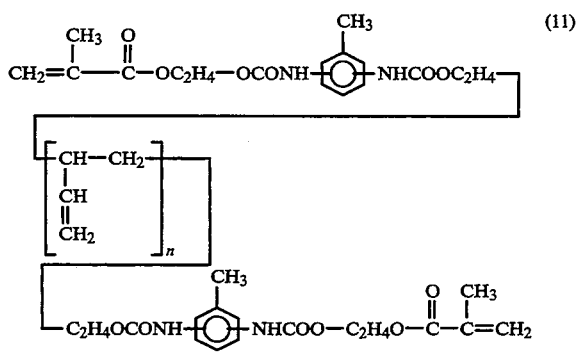

Reference Example 4

In the same manner as in Reference Example 3, polymerization was carried out by using 50 parts by weight of methyl methacrylate syrup dissolved 20% by weight of methyl methacrylate polymer with a polymerization degree of 1400 therein, 40 parts by weight of methoxydiethyleneglycol methacrylate and 10 parts by weight of a compound represented by the following formula (12) with 0.030 part by weight of 2,2′-azobis(4-methoxy-2,4-dimethylvaleronitrile) and 0.0075 part by weight of 1,4(8)-P-menthadiene at 60° C. for 2 hours to obtain a partially cross-linked polymer gel having a polymer content of 60%. After pulverizing the polymer gel in the same manner as in Reference Example 3, the same prepared solution as in reference Example 3 was added and kneaded to obtain a composition.

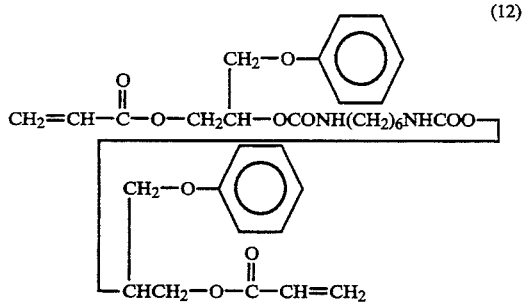

(12)

Reference Example 5

80 Parts by weight of methyl methacrylate, 20 parts by weight of ethylene glycol dimethacrylate, 0.01 part by weight of 1,4(8)-P-menthadiene, 0.003 part by weight of 2,2'-azobis(4-methoxy-2,4-dimethylvaleronitrile), 0.1 part by weight of 2,2-bis(t-butylperoxy)butane, 0.3 part by weight of di-t-butylperoxide and 0.05 part by weight of di-t-butylperoxyhexahydroterephthalate were mixed and dissolved. The mixture was polymerized in the same manner as in Reference Example 1 at 60° C. for 2 hours to obtain a partially cross-linked polymer gel having a polymer content of 30%. Subsequently, the polymer gel was pulverized in the same manner as in Reference Example 1.

Examples 1 and 2

Into a supermixer (available from Kawata Mfg. Co. Ltd.) were placed in the composition (A) of Reference Example 1, or the composition (B) of Reference Example 2, and methyl methacrylate monomer containing as polymerization initiators 0.1% by weight of 2,2-bis(t-butylperoxy)butane, 0.3% by weight of di-t-butylperoxide and 0.05% by weight of di-t-butylperoxyhexahydroterephthalate with a ratio as shown in Table 2. The mixture was stirred and mixed for about 5 minutes to obtain a composition (hereinafter abbreviated to "modified composition") enriched in tackiness, permeability, etc.

TABLE 2

| | Composition (parts by weight) | Methyl methacrylate containing polymerization initiators (parts by weight) | Viscosity of modified composition (poise) |
| --- | --- | --- | --- |
| Example 1 | (A):80 | 20 | $5 \times 10^4$ |
| Example 2 | (B):90 | 10 | $1.5 \times 10^4$ | subsequently, on a lauan plywood having a length of 300 mm, a width of 300 mm and a thickness of 12 mm was substantially uniformly spread 45 g of the above "modified composition". A birch veneer having a length of 300 mm, a width of 300 mm and a thickness of 0.6 mm was placed on the surface thereof as a decorative veneer. Further, a polyethylene terephthalate film with a thickness of 25 μm was placed as a release film. The material was sandwiched between stainless steel plates each having a thickness of 3 mm and inserted into the opening of the hot plates of a hot press pre-heated to 125° C. It was then pressurized and heated at 10 kg/cm² for 20 minutes. Thereafter, the molded product was removed from the press with the stainless steel plates. After cooling to room temperature, the molded product was removed from the plates. An adhesion layer having a thickness of about 0.4 mm was formed between the decorative veneer and the base board of the resulting molded product. The parts of the molded product were integrally adhered with one another. The front surface of the decorative veneer showed good appearance as wetting with a resin.

Examples 3 to 6

To the composition of Reference Example 4 was added a prepared solution comprising 50 parts by weight of methyl methacrylate syrup of Reference Example 4, 40 parts by weight of methoxydiethyleneglycol methacrylate, 10 parts by weight of the compound represented by the above formula (12) and, as polymerization initiators, 0.1 part by weight of 2,2-bis(t-butylperoxy)butane, 0.3 part by weight of di-t-butylperoxide and 0.05 part by weight of di-t-butylperoxyhexahydroterephthalate. The mixture was kneaded by a supermixer to obtain a "modified composition" having a viscosity shown in Table 3 respectively.

Except for placing 115 g of the above modified composition between plywood and a Japanese oak veneer having a thickness of 0.25 mm and for changing the heating temperature to 130° C., the same procedure as in Example 1 was carried out to form a decorative board. Flash formed by flow of the modified composition from an opening between the decorative veneer and the base board to outside during molding was evaluated. An amount of flash of less than 15% based on the amount of composition used was judged as passing the test (passed inspection). Also, the surface of the decorative veneer of the decorative board obtained was observed with the naked eye, and when the wet feeling due to resin was good, it was evaluated as good.

TABLE 3

| | Viscosity of modified composition (poise) | Flash | Appearance |
| --- | --- | --- | --- |
| Example 3 | $3 \times 10^4$ | Pass the test | Pass the test |
| Example 4 | $2 \times 10^6$ | Pass the test | Pass the test |
| Example 5 | $6 \times 10^6$ | Pass the test | Rejected |
| Example 6 | $2 \times 10^3$ | Rejected | Pass the test |

Examples 7 to 10

To 52 parts by weight of the composition of Reference Example 4 was added 48 parts by weight of a prepared solution comprising 50 parts by weight of methyl methacrylate syrup of Reference Example 4, 40 parts by weight of methoxydiethyleneglycol methacrylate, 10 parts by weight of the compound represented by the above formula (12) and as polymerization initiators, 0.1 part by weight of 2,2-bis(t-butylperoxy)butane, 0.3 part by weight of di-t-butylperoxide and 0.05 part by weight of di-tbutylperoxyhexahydroterephthalate. The mixture was kneaded by a supermixer to obtain "modified compositions" having a viscosity of $3 \times 10^4$ poise.

Except for placing a predetermined amount of the above modified composition between plywood and a Japanese oak veneer sheet having a thickness of 0.25 mm and for changing the heating temperature to 130° C., the same procedure as in Example 1 was carried out to form a decorative board having an adhesive layer with a thickness as shown in Table 4. Characteristics of the resulting decorative boards are as shown in Table 4. Also, a tensile breakage elongation of a polymerized and cured product of the above "modified composition" was each 18%.

TABLE 4

|  | Thickness of adhesion layer (mm) | Cool-hot repeated property | Adhesiveness evaluation |
| --- | --- | --- | --- |
| Example 7 | about 1.2 | Pass the test | Pass the test |
| Example 8 | about 1.0 | Pass the test | Pass the test |
| Example 9 | about 0.3 | Pass the test | Pass the test |
| Example 10 | about 0.15 | Rejected | Pass the test |

The decorative boards shown in Table 4 each exhibited a good appearance with the front surface of the decorative veneer having the appearance of being wet by a resin.

Example 11

Except for spreading 110 g of the composition obtained in Reference Example 3 between lauan plywood having a length of 300 mm, a width of 300 mm and a thickness of 12 mm and a birch veneer having a length of 300 mm, a width of 300 mm and a thickness of 0.6 mm as a decorative veneer and for changing the heating temperature to 130° C., the material was molded in the same manner as in Example 1 to form a decorative board. The thickness of the adhesive layer was about 1.0 mm, appearance was good, and the adhesive evaluation and cool-hot repeated evaluation were also both good. The viscosity of the composition was $1.8 \times 10^5$ poise and a tensile breakage elongation of a polymerized and cured product of the composition was 41%.

Examples 12 to 14

The modified composition (C) of Example 8, a modified composition (D) obtained by adding 48 parts by weight of a prepared solution comprising 100 parts by weight of a methyl methacrylate syrup dissolved 10% of a methyl methacrylate polymer with a polymerization degree of 8000 and the same polymerization initiators as in Example 8 to 52 parts by weight of the composition of Reference Example 4. This was kneaded with a supermixer. A modified composition (E) obtained by adding 10 parts by weight of the same prepared solution as in the above composition (D) to 90 parts by weight of the composition of Reference Example 5. This was kneaded with a supermixer. The compositions were each substantially uniformly placed with a predetermined amount between plywood and a Japanese oak veneer having a thickness of 0.25 mm to form a decorative board having an adhesive layer with a thickness of about 0.8 mm in the same manner as in Example 3. Properties of the resulting decorative boards and tensile breakage elongation of the polymerized and cured products of the above modified compositions (C) to (E) are as shown in Table 5.

TABLE 5

|  | Kind of modified composition | Tensile breakage elongation of cured product (%) | Cool-hot repeated property evaluation |
| --- | --- | --- | --- |
| Example 12 | (C) | 18 | Pass the test |
| Example 13 | (D) | 6 | Pass the test |
| Example 14 | (E) | 4 | Rejected |

Examples 15 and 16

In the same manner as in Example 12, except for using slate with a thickness of 5 mm or a cross-linked methacrylate resin plate (Paralinx TS25, trade name, available from Kuraray Co. Ltd.) instead of a plywood as a base board, decorative boards were molded, respectively. The appearance of the resulting decorative boards was each good and adhesive evaluation and cool-hot repeated evaluation also passed the test.

Comparative Example 1

On a lauan plywood having a length of 300 mm, a width of 300 mm and a thickness of 12 mm was uniformly coated 10 g of an adhesive agent in which 30 parts by weight of wheat powder and 0.5 part by weight of ammonium chloride had been added to 100 parts by weight of a modified urea type resin (Oshika Resin 1331, trade name, available from Oshika Shinko Co. Ltd.) for adhering decorative veneers. A Japanese oak veneer sheet having a length of 300 mm, a width of 300 mm and a thickness of 0.2 mm was placed on the surface thereof as a decorative veneer. The material was sandwiched between stainless steel plates each having a thickness of 3 mm and inserted into an opening of the hot plates of a hot press pre-heated to 110° C. It was then pressurized and heated at 10 kg/cm$^2$ for 2 minutes. Thereafter, the molded product was removed from the press with the stainless steel plates. After cooling to room temperature, the molded product was removed from the plates. Whereas the decorative veneer and the plywood were integrally adhered, no wet feeling due to permeation of a resin was observed at the front surface of the decorative veneer of the resulting molded product. Also, the cool-hot repeated evaluation was rejected.

Comparative Example 2

In the same manner as in Comparative Example 1 except for changing the amount of the resin composition to be used to 40 g, molding was carried out.

Whereas the decorative veneer and the plywood were integrally adhered, the front surface of the decorative veneer of the resulting molded product exhibited an appearance that the resin locally flowed out from a relatively large opening of the veneer sheet. No wet feeling due to permeation of a resin was observed. Also, the cool-hot repeated evaluation was rejected.

Comparative Example 3

In the same manner as in Comparative Example 1 except for changing the resin composition to a resin composition in which 0.5 part by weight of ammonium chloride was added to 100 parts by weight of the resin (Oshika Resin 1331, trade name) for adhering a decorative veneers as used in Comparative Example 1. 40 g of the resin composition was used. Molding was carried out.

Local adhesion deficiency occurred between the decorative veneer and the plywood. A large amount of the resin flowed out from the gap between the decorative veneer and the plywood to the outside. The front surface of the decorative veneer of the resulting molded product showed an appearance that the resin locally flowed out from a relatively large opening of the veneer sheet. No wet feeling was observed.

Comparative Example 4

In the same manner as in Comparative Example 1 except for changing the amount of the resin composition to be used to 100 g, molding was carried out.

Local adhesion deficiency occurred between the decorative veneer and the plywood. A large amount of the resin flowed out from the gap between the decorative veneer and the plywood to the outside. The front surface of the decorative veneer of the resulting molded product showed an appearance that a resin locally flowed out from a relatively large opening of the veneer sheet. No wet feeling due to permeation of the resin was observed.

Comparative Example 5

In the same manner as in Comparative Example 1 except for changing the resin composition to be used to 80 g of a resin composition comprising 50 parts by weight of methyl methacrylate, 50 parts by weight of an unsaturated polyester resin (molecular weight: 2200) and 2 parts by weight of benzoyl peroxide, changing the heating temperature to 125° C., and the heating and pressuring time to 20 minutes, molding was carried out. No adhesion layer was formed between the decorative veneer and the plywood and the materials were not integrally adhered.

We claim:

1. A method for preparing a resin-reinforced decorative board which comprises the steps of interposing an acrylic partially cross-linked polymer gel between a decorative veneer and a base board, pressurizing and heating the materials to permeate at least part of components constituting said polymer gel into the decorative veneer or both the decorative veneer and the base board, and polymerizing the substance to laminate the decorative veneer and the base board through an adhesive layer formed from said polymer gel.

2. The method of claim 1, wherein the acrylic partially cross-linked polymer gel has a composition obtained by subjecting to partial polymerization of a mixture composed of 3 to 60% by weight of a cross-linking monomer principally composed of a di(meth)acrylate containing at least two urethane linkages and 97 to 40% by weight of an unsaturated monomer principally composed of methyl methacrylate which may contain its polymer dissolved therein, and containing a polymer in an amount not exceeding the range of 80% by weight and increasing a polymer content 4 to 62% by weight than that in the above mixture.

3. The method of claim 1, wherein the partially cross-linked polymer gel is pulverized or kneaded.

4. The method of claim 1, wherein the partially cross-linked polymer gel is further mixed dispersively and kneaded after adding 1 to 100 parts by weight of an unsaturated monomer principally comprising an alkyl methacrylate which may contain a cross-linking monomer, or syrup principally comprising an alkyl methacrylate which contain its polymer dissolved therein and may contain a cross-linking monomer based on 100 parts by weight of the partially cross-linked polymer gel.

5. The method of claim 1, wherein the adhesive layer has a thickness of 0.2 to 3 mm.

6. The method of claim 1, wherein tensile breakage elongation after polymerizing the partially cross-linked polymer gel is 5 to 100%.

7. A method for preparing a resin-reinforced decorative board according to claim 1 wherein said acrylic partially cross-linked polymer gel has a viscosity in the range of $3 \times 10^3$ to $5 \times 10^6$ poise at 50° C.

8. A resin-reinforced decorative board prepared by the method as claimed in any preceding claim.

* * * * *